Nov. 13, 1928.　　　F. SIGRIST ET AL　　　1,691,362

SKELETON STRUCTURE SUCH AS AIRCRAFT FUSELAGES

Filed June 15, 1927

FREDRICK SIGRIST
SYDNEY CAMM
INVENTOR;

By
their Attorney.

Patented Nov. 13, 1928.

1,691,362

UNITED STATES PATENT OFFICE.

FREDRICK SIGRIST, OF OXSHOTT, AND SYDNEY CAMM, OF LONG DITTON, ENGLAND.

SKELETON STRUCTURE SUCH AS AIRCRAFT FUSELAGES.

Application filed June 15, 1927, Serial No. 198,951, and in Great Britain March 31, 1927.

The present invention relates to skeleton structures and more particularly to metal constructed fuselages of aircraft in which connection it will hereinafter be described.

The primary objects of the invention are to provide an aircraft fuselage which is of simple, light and economical construction.

According to this invention the longérons of a fuselage and the interlongéron struts or bracing members are formed of metal tubes which are squared or formed with flats at the joints or which are of square, flattened or rectangular cross section throughout their length. The longérons and the bracing members or struts in either the vertical or horizontal bracing or both may be connected together at each joint by plates bolted or riveted to each of the adjacent members.

Each side of the fuselage is preferably formed as a Warren, Pratt or like girder with the top and bottom longérons forming the top and bottom booms thereof and with each joint formed by a pair of metal clamping plates bolted or riveted to each of the adjacent members and the horizontal bays of the fuselage are formed by horizontal struts between the longérons braced by wires. These clamping plates are preferably connected to the struts or bracing members of the Warren, Pratt or like girder by means of hollow rivets which are expanded in position and to the longérons by a horizontal bolt passing therethrough and having an enlarged head which clamps a wiring plate or plates for the wire bracing against the side plates and is provided with means for engaging the horizontal struts of the horizontal bays. The wiring plate or plates may be provided with or comprise three lugs, two for the wire bracing in adjacent horizontal bays and one for the wire bracing in the plane of the axes of one set of the bracing members of the girders. The lugs of these wiring plates are set so that the line of each of the bracing wires passes through a common point in the axis of the longéron thereby obviating offset bending moments in the longérons.

In order that the invention may be more fully understood it will now be described with reference to a practical example of construction which is illustrated in the accompanying drawings. These drawings illustrate a joint between the top longéron of a side of an aeroplane fuselage of Warren girder formation and the bracing members of the girder. They illustrate also the method of engagement between the longérons and the horizontal struts.

Figure 1:
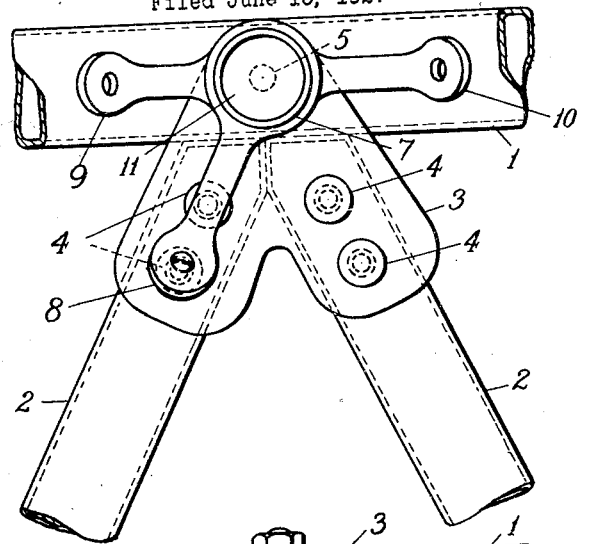
Figure 1 is a side view as seen from the inside of the fuselage, the horizontal strut being omitted.
Figure 2:
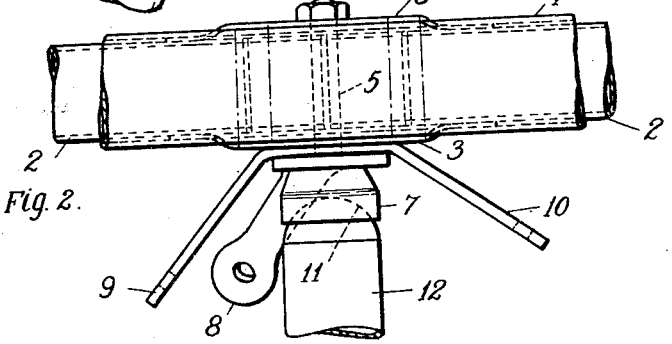
Figure 2 is a plan.
Figure 3:
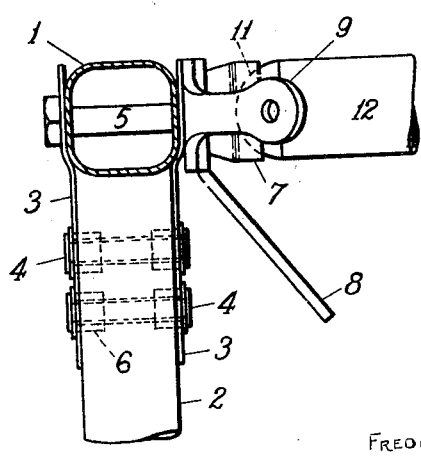

Figure 3 an end view looking from right to left of Figure 1.

Referring now to these figures, 1 is the top longéron of a side of a fuselage of Warren girder formation and 2, 2 are struts extending between it and the lower longéron which is not shown. The longérons are formed of steel tubes squared or formed with flats at right angles so as to form a square in cross section with rounded corners as shown in Figure 3. This section has been found to possess the advantages of enabling a simple, strong and light joint to be made. The top and bottom longérons on each side of the fuselage are braced by square tubes 2, 2 of duralumin or steel of the same cross section disposed in Warren girder formation so that each side of the fuselage forms a Warren girder. The inclination between each pair of bracing members may be such that the longéron is stressed equally in each free length throughout its length whereby a structure of the greatest possible efficiency is obtained. Each joint of the Warren girder is formed by a pair of flat plates 3, 3 of approximately triangular formation which clamp the three abutting members between them by means of two hollow rivets 4 through each bracing member 2 and a bolt 5 through the axis of the longéron. The rivets may be expanded into ferrules 6 placed in the holes of the clamping plates and bracing tubes. The bolt 5 has an enlarged head 7 on the inner side of the Warren girder and wiring plates comprising three lugs, 8, 9, 10 are mounted upon it so as to be clamped to the side of the longéron 1 between this head 7 and one of the joint plates 3. The enlarged head of each bolt is provided with a cup 11 to receive the end of the corresponding horizontal strut 12 forming part of the top or bottom bays the said end being rounded or ball shaped. The horizontal struts may be formed of either square or circular tubes of duralumin or steel having ball ended plugs of steel in the ends. In a modification the horizontal struts may be cup ended and the bolts ball ended. The ends of the bracing tubes of the Warren girder are preferably cut at suitable angles to abut against each other and the longérons at the joints as shown in Figure 1. The structure is braced horizontally with the usual wires in the horizontal bays to take side thrust and diagonally in the plane of one set of members of the Warren girder system to take torsion on the fuselage.

This system of fuselage construction enables a very light, strong and rigid structure to be made which may be readily assembled, trued up, or disassembled and packed for transport.

It will be noted that an important feature of the invention is the provision of flats upon the metal tubular members at the joints for engagement by the clamping plates, and that from this aspect the formation of the structure from tubular members which are squared or of rectangular section at the joints, or which are of square, flattened or rectangular cross section throughout their length, are particular instances of structures formed of tubular members provided with flats at the joints.

It will also be noted that by the provision of flats at right angles on a tubular member (such as a longéron) at the joint or throughout its length, the end of an abutting member meeting it at right angles or inclined to it may be readily prepared to abut flush against it by a simple plane cut at the appropriate angle, thus securing the close abutment advisable to form a good joint without any difficult or lengthy shaping of the end of the abutting member.

We claim,

1. A skeleton structure such as a fuselage for aircraft, comprising side frames spaced apart, each side frame comprising tubular members provided with flats at the joints, clamping plates engaging the flats, fastening means extending through the plates and the tubular members meeting at a joint, said fastening means comprising bolts having heads on the insides of the said frames provided with spherical bearing surfaces, horizontal struts between the opposite longérons having their ends formed with spherical bearing surfaces adapted to engage the spherical bearing surfaces of opposite bolt heads, and wire bracing between the said frames.

2. A skeleton structure such as a fuselage for aircraft, comprising side frames spaced apart, each side frame comprising tubular members provided with flats at the joints, clamping plates engaging the flats, fastening means extending through the plates and the tubular members meeting at a joint, said fastening means comprising bolts having heads on the insides of the said frames provided with spherical bearing surfaces, horizontal struts between the opposite longérons having their ends formed with spherical bearing surfaces adapted to engage the spherical bearing surfaces of opposite bolt heads, wiring plates clamped between the bolt heads and the clamping plates on the insides of the side frames, and wire bracing between said side frames and connected with said wiring plates.

3. A skeleton structure comprising tubular longérons and interlongéron struts or bracing members provided with flats at the joints, the said longérons being continuous through the joints, clamping plates engaging the flats, and fastening means extending through the plates and the longérons and interlongéron struts or bracing members at the joints.

4. A skeleton structure such as a fuselage for aircraft comprising side frames spaced apart, each side frame comprising upper and lower tubular longérons and interlongéron struts or bracing members provided with flats at the joints, the said longérons being continuous through the joints, clamping plates engaging the flats, fastening means extending through the plates the longérons and the interlongéron struts or bracing members, said fastening means comprising bolts having heads on the insides of the side frames adapted to engage horizontal struts between the opposite longérons, and horizontal struts engaged by said bolt heads.

5. A skeleton structure such as a fuselage for aircraft comprising side frames spaced apart, each side frame comprising upper and lower tubular longérons and interlongéron struts or bracing members provided with flats at the joints, clamping plates engaging the flats, fastening means extending through the plates the longérons and the interlongéron struts or bracing members, said fastening means comprising bolts having heads on the insides of the side frames provided with spherical bearing surfaces, horizontal struts between the opposite longérons having their ends formed with spherical bearing surfaces adapted to engage the spherical bearing surfaces of opposite bolt heads, and wire bracing between the said side frames.

6. A skeleton structure such as a fuselage for aircraft comprising side frames spaced apart, each side frame comprising upper and lower tubular longérons and interlongéron struts or bracing members provided with flats at the joints, clamping plates engaging the flats, fastening means extending through the plates the longérons and the interlongéron struts or bracing members, said fastening means comprising bolts having heads on the insides of the side frames provided with spherical bearing surfaces, horizontal struts between the opposite longérons having their ends formed with spherical bearing surfaces adapted to engage the spherical bearing surfaces of opposite bolt heads, wiring plates clamped between the bolt heads and the clamping plates on the insides of the side frames, and wire bracing between said side frames and connected with said wiring plates.

7. A skeleton structure such as a fuselage for aircraft comprising side frames spaced apart, each side frame comprising upper and lower longérons and interlongéron struts or bracing members the said struts or bracing members being disposed in zig-zag girder formation between the upper and lower longérons and the said longérons and struts or bracing members being provided with flats at the joints, and the longérons being continuous through the joints, clamping plates engaging the flats, fastening means extending through the plates the longérons and the interlongéron struts or bracing members, said fastening means comprising bolts having heads on the insides of the side frames adapted to engage horizontal struts between the opposite longérons, and horizontal struts engaged by said bolt heads.

8. A skeleton structure such as a fuselage for aircraft comprising side frames spaced apart, each side frame comprising upper and lower longérons and interlongéron struts or bracing members the said struts or bracing members being disposed in zig-zag girder formation between the upper and lower longérons and the said longérons and struts or bracing members being provided with flats at the joints, clamping plates engaging the flats, fastening means extending through the plates the longérons and the interlongéron struts or bracing members, said fastening means comprising bolts having heads on the insides of the side frames provided with spherical bearing surfaces, horizontal struts between the opposite longérons having their ends formed with spherical bearing surfaces adapted to engage the spherical bearing surfaces of opposite bolt heads, and wire bracing between the said side frames.

9. A skeleton structure such as a fuselage for aircraft comprising side frames spaced apart, each side frame comprising upper and lower longérons and interlongéron struts or bracing members the said struts or bracing members being disposed in zig-zag girder formation between the upper and lower longérons and the said longérons and struts or bracing members being provided with flats at the joints, clamping plates engaging the flats, fastening means extending through the plates the longérons and the interlongéron struts or bracing members, said fastening means comprising bolts having heads on the insides of the side frames provided with spherical bearing surfaces, horizontal struts between the opposite longérons having their ends formed with spherical bearing surfaces adapted to engage the spherical bearing surfaces of opposite bolt heads, wiring plates clamped between the bolt heads and the clamping plates on the insides of the side frames, and wire bracing between said side frames and connected with said wiring plates.

10. A skeleton structure comprising metal tubular longérons and interlongéron struts or bracing members provided with flats at the joints to receive clamping plates, and the longérons being continuous through the joints, the abutting ends of said interlongéron struts or bracing members being cut to abut flush against other flats on the longérons transverse to the first mentioned flats, clamping plates engaging the first mentioned flats, and fastening means extending through the plates and the interlongéron struts or bracing members.

11. A skeleton structure comprising metal tubular longérons and interlongéron struts or bracing members provided with flats at the joints to receive clamping plates, and the said longérons being continuous through the joints, the abutting ends of said interlongéron struts or bracing members being cut to abut flush against other flats on the longérons at right angles to the first mentioned flats and against each other, clamping plates engaging the first mentioned flats, and fastening means extending through the plates and the interlongéron struts or bracing members.

12. A skeleton structure such as a fuselage for aircraft comprising a metal tubular member, another metal tubular member with its end abutting against the first mentioned member intermediate of the ends of said first mentioned member to constitute a joint therewith, the said members being provided with flats at the joint, a clamping plate engaging the flats and fastening means extending through the plates and the tubular members meeting at the joint.

In witness whereof we have hereunto set our hands.

FREDRICK SIGRIST.
SYDNEY CAMM.